United States Patent
Maheshwari et al.

(10) Patent No.: US 10,484,075 B1
(45) Date of Patent: Nov. 19, 2019

(54) ANTENNA SELECTION MECHANISM TO ENHANCE USER EXPERIENCE

(71) Applicant: QUALCOMM Incorporated, San Diego, CA (US)

(72) Inventors: Ankit Maheshwari, Hyderabad (IN); Rimal Patel, Hyderabad (IN); Atul Soni, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/145,736

(22) Filed: Sep. 28, 2018

(51) Int. Cl.
| | | |
|---|---|---|
| *H04B 7/06* | (2006.01) | |
| *H04B 7/08* | (2006.01) | |
| *H04W 24/02* | (2009.01) | |
| *G06F 1/16* | (2006.01) | |
| *H04W 36/14* | (2009.01) | |
| *H04W 88/06* | (2009.01) | |

(52) U.S. Cl.
CPC .......... *H04B 7/082* (2013.01); *G06F 1/1698* (2013.01); *H04B 7/0608* (2013.01); *H04W 24/02* (2013.01); *H04W 36/14* (2013.01); *H04W 88/06* (2013.01)

(58) Field of Classification Search
CPC ..... H04B 7/082; H04B 7/0608; H04W 36/14; H04W 88/06; H04W 24/02; G06F 1/1698
See application file for complete search history.

(56) References Cited

U.S. PATENT DOCUMENTS

| | | | |
|---|---|---|---|
| 8,811,918 B2 | 8/2014 | Rath et al. | |
| 8,953,474 B2 | 2/2015 | Ali et al. | |
| 9,461,687 B2 | 10/2016 | Ding et al. | |
| 9,867,139 B1* | 1/2018 | Khasgiwala | ........ H04W 52/367 |
| 2008/0291830 A1* | 11/2008 | Pernu | ................... H04W 72/02 370/236 |
| 2011/0012792 A1 | 1/2011 | Krenz et al. | |
| 2013/0178167 A1 | 7/2013 | Lockerbie et al. | |
| 2014/0192664 A1* | 7/2014 | Ericson | ................. H04W 24/10 370/252 |
| 2016/0098053 A1* | 4/2016 | Khawand | .................. G05F 3/02 307/116 |
| 2017/0192478 A1* | 7/2017 | Mercer | ..................... G06F 1/28 |
| 2017/0373712 A1* | 12/2017 | Kim | ..................... H04B 17/318 |

* cited by examiner

*Primary Examiner* — Dac V Ha
(74) *Attorney, Agent, or Firm* — Hunter Clark PLLC (57) ABSTRACT

Techniques for reducing the impact of specific absorption rate (SAR) based on a transmit power back-off value in multi-antenna mobile devices are provided. An example mobile device includes a first radio frequency resource associated with first specific absorption information, a second radio frequency resource associated with second specific absorption information, and a processor configured to generate a first signal associated with a first quality of service, generate a second signal associated with a second quality of service, cause the first signal to be transmitted over one of the first radio frequency resource and the second radio frequency resource based at least in part on the first specific absorption information and the second specific absorption information, and cause the second signal to be transmitted over whichever of the first radio frequency resource and the second radio frequency resource is not used to transmit the second signal.

28 Claims, 9 Drawing Sheets

| LTE BAND NUMBER | UPLINK (MHZ) | DOWNLINK (MHZ) |
| --- | --- | --- |
| 1 | 1920 - 1980 | 2110 - 2170 |
| 2 | 1850 - 1910 | 1930 - 1990 |
| 3 | 1710 - 1785 | 1805 - 1880 |
| 4 | 1710 - 1755 | 2110 - 2155 |
| 5 | 824 - 849 | 869 - 894 |
| 6 | 830 - 840 | 875 - 885 |
| 7 | 2500 - 2570 | 2620 - 2690 |
| 8 | 880 - 915 | 925 - 960 |
| 9 | 1749.9 - 1784.9 | 1844.9 - 1879.9 |
| 10 | 1710 - 1770 | 2110 - 2170 |
| 11 | 1427.9 - 1452.9 | 1475.9 - 1500.9 |
| 12 | 698 - 716 | 728 - 746 |
| 13 | 777 - 787 | 746 - 756 |
| 14 | 788 - 798 | 758 - 768 |
| 15 | 1900 - 1920 | 2600 - 2620 |
| 16 | 2010 - 2025 | 2585 - 2600 |
| 17 | 704 - 716 | 734 - 746 |
| 18 | 815 - 830 | 860 - 875 |
| 19 | 830 - 845 | 875 - 890 |
| 20 | 832 - 862 | 791 - 821 |
| 21 | 1447.9 - 1462.9 | 1495.5 - 1510.9 |
| 22 | 3410 - 3500 | 3510 - 3600 |
| 23 | 2000 - 2020 | 2180 - 2200 |
| 24 | 1625.5 - 1660.5 | 1525 - 1559 |
| 25 | 1850 - 1915 | 1930 - 1995 |
| 26 | 814 - 849 | 859 - 894 |
| 27 | 807 - 824 | 852 - 869 |
| 28 | 703 - 748 | 758 - 803 |
| 29 | n/a | 717 - 728 |
| 30 | 2305 - 2315 | 2350 - 2360 |
| 31 | 452.5 - 457.5 | 462.5 - 467.5 |

ANTENNA SELECTION MECHANISM TO ENHANCE USER EXPERIENCE

BACKGROUND

A wireless device (e.g., a cellular phone or a smart phone) may include multiple transmitters and receivers to support two-way communication. Many wireless devices are configured to simultaneously operate on multiple different frequencies. A wireless device may be configured to communicate with another station via combinations low, medium, or high frequency bands. Each frequency band generally requires a dedicated antenna system within the wireless device. The location of an antenna system within the device may have a substantial impact on the output power of the corresponding transmitter. For example, antenna systems located near the ear of a user may be power limited in an effort to minimize the user's exposure to radio frequency emissions. A Specific Absorption Rate (SAR) index is used to measure the rate at which energy is absorbed by the human body when exposed to a radio frequency electromagnetic field. The Federal Communications Commission (FCC) establishes limits for SAR and many wireless devices implement transmitter power limits based on feedback from a proximity sensor.

SUMMARY

An example of a mobile device according to the disclosure includes a first radio frequency resource associated with first specific absorption information, a second radio frequency resource associated with second specific absorption information, at least one processor operably coupled to the first radio frequency resource and the second radio frequency resource and configured to generate a first signal associated with a first quality of service, generate a second signal associated with a second quality of service, the second quality of service being less than the first quality of service, cause the first signal to be transmitted over one of the first radio frequency resource and the second radio frequency resource based at least in part on the first specific absorption information and the second specific absorption information, and cause the second signal to be transmitted over whichever of the first radio frequency resource and the second radio frequency resource is not used to transmit the second signal.

Implementations of such a mobile device may include one or more of the following features. The first radio frequency resource may include a first transceiver and the second radio frequency resource includes a second transceiver. The first transceiver may be configured to operate in a first frequency band, and the second transceiver may be configured to operate in a second frequency band that is different from the first frequency band. A plurality of proximity sensors may be operably coupled to the at least one processor and configured to detect a presence of a user, such that the first specific absorption information and the second specific absorption information may be based on information from respective sensors of the plurality of proximity sensors. The first signal may include a voice signal. The first specific absorption information may include a first power back-off value, and the second specific absorption information may include a second power back-off value.

An example of a mobile device according to the disclosure includes a plurality of transmitters, at least one processor operably coupled to the plurality of transmitters and configured to determine specific absorption information for each of the plurality of transmitters, determine a quality of service requirement for each of a plurality of data packets, determine a transmission schedule based at least in part on the quality of service requirements and the specific absorption information for the plurality of transmitters, and transmit the plurality of data packets via the plurality of transmitters based on the transmission schedule.

Implementations of such a mobile device may include one or more of the following features. At least one proximity sensor may be operably coupled to the at least one processor and configured to detect a presence of a user. The at least one processor may be configured to determine the specific absorption information based at least in part on an input from the at least one proximity sensor. One of the plurality of transmitters may be associated with a relatively low specific absorption information, and the transmission schedule may indicate that a data packet with a high quality of service requirement is transmitted on the one of the plurality of transmitters based on the relatively low specific absorption information. The at least one processor may be configured to determine specific absorption information for each of the plurality of transmitters by determining a transmit power back-off value for each of the plurality of transmitters. The at least one processor may be configured to determine the transmission schedule based at least in part on the transmit power back-off values for each of the plurality of transmitters. The at least one processor may be configured to determine that one of the plurality of transmitters is associated with a relatively low transmit power back-off value, and to schedule a data packet with a high quality of service requirement for transmission on the one of the plurality of transmitters based on the relatively low transmit power-back off value. The plurality of data packets may include voice data and the quality of service requirement for the voice data is a high quality of service. The mobile device may be configured to transmit the plurality of data packets using the plurality of transmitters by transmitting the plurality of data packets using inter-band or intra-band non-contiguous carrier aggregation. The at least one processor may be configured to determine the transmission schedule at least in part by assigning each data packet to a carrier or band of a plurality of carriers or bands based at least in part on the quality of service requirements and the specific absorption information for the plurality of transmitters.

An example of a method for mitigating an impact of transmitter power back-off in a mobile device according to the disclosure includes generating a first signal and a second signal, the first signal being associated with a higher quality of service as compared to the second signal, determining a first antenna maximum transmit power for a first antenna based on first specific absorption information associated with the first antenna, determining a second antenna maximum transmit power for a second antenna based on second specific absorption information associated with the second antenna, determining a primary antenna and a secondary antenna based on the first antenna maximum transmit power and the second antenna maximum transmit power, the maximum transmit power of the primary antenna being greater than the maximum transmit power of the secondary antenna, and transmitting the first signal on the primary antenna and the second signal on the secondary antenna.

Implementations of such a method may include one or more of the following features. The first antenna may be configured to operate at a first frequency, and the second antenna may be configured to operate at a second frequency, the first frequency being lower than the second frequency. The first antenna may be configured to operate at a first frequency, and the second antenna may be configured to operate at a second frequency, the first frequency being higher than the second frequency. The first signal may include a voice signal. The presence of a user may be detected. Determining the first antenna maximum transmit power and the second antenna maximum transmit power may include obtaining one or more transmit power back-off values from a memory unit. Generating the first signal and the second signal may include generating the first signal with a first transceiver and generating the second signal with a second transceiver. The first transceiver may be configured to operate in a first frequency band, and the second transceiver may be configured to operate in a second frequency band that is different from the first frequency band.

An example of a method for transmitting data in a carrier aggregation scheme according to the disclosure includes determining specific absorption information for each of a plurality of transmitters in a mobile device, determining a quality of service requirement for each of a plurality of data packets, determining a transmission schedule based at least in part on the quality of service requirements and the specific absorption information for the plurality of transmitters, and transmitting the plurality of data packets via the plurality of transmitters based on the transmission schedule.

Implementations of such a method may include one or more of the following features. A presence of a user may be detected based on input from one or more presence sensors. The specific absorption information for each of the plurality of transmitters may be based at least in part on the input from the one or more presence sensors. The plurality of transmitters may be associated with a relatively low specific absorption information, and the transmission schedule may indicate that a data packet with a high quality of service requirement is transmitted on the one of the plurality of transmitters based on the relatively low specific absorption information. The specific absorption information for each of the plurality of transmitters may include determining a transmit power back-off value for each of the plurality of transmitters. The plurality of data packets may include voice data and the quality of service requirement for the voice data is a high quality of service.

Items and/or techniques described herein may provide one or more of the following capabilities, as well as other capabilities not mentioned. A mobile device may establish communications with a station. The communications may be based on a carrier aggregation scheme including a plurality radio frequency (RF) resources. The communications may support high and low quality of service data exchanges. The transmit power of a RF resource may be based on the proximity of an antenna to a user. One or more transmit power back-off values may be applied to one or more of the RF resources in an effort to reduce the user's exposure to RF energy. A scheduler may be configured to prioritize the transmission of data packets based on the expected quality of service and the transmit power back-off values. The negative impact of the transmit power back-off to the user may be partially or wholly mitigated. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Techniques are discussed herein for reducing the impact of specific absorption rate (SAR) based on a transmit power back-off value in multi-antenna mobile devices. SAR refers to the energy absorbed by the human body. SAR requirements are prescribed for wireless devices such as cellular phones, tablets, and other types of mobile devices for example, to limit human exposure to radio frequency (RF) electromagnetic energy radiated from the devices. To meet these requirements, some devices reduce their transmit power from a maximum value or other established power value before certain transmissions. This reduction of transmit power to meet the SAR requirements is referred to as a "transmit power back-off" throughout this document.

The transmit power back-off employed to meet the SAR requirements may change dynamically depending on the position or proximity of a device in relation to a user. Further, the SAR index may be different for each antenna system in a wireless device. Lowering the transmit power of one or more of the transmitters may increase the Block Error Rate (BLER) and decrease the quality of service between the transmitting and receiving stations. Because voice transmission is likely to have higher priority than the data transmission, the device may lower its data transmission power, while maintaining voice transmission power, for example, to implement SAR back-off in a manner which reduces impacts on the user. Otherwise, the user experience may be impacted by the transmit power back-off with a decrease in the quality of service of a voice call (e.g., the call may require significant retransmissions or may be dropped in cell edge scenarios). The negative impacts to the user experience may thus be mitigated by implementing a mechanism to prioritize high quality of service data when SAR based transmitter power limiting is applied.

In general, many mobile device hardware designs include multiple antenna solutions to accommodate high, medium and low frequency bands. Each of the antennas may have a different SAR value based on the proximity of the user. Generally, an antenna mounted near the microphone may use higher transmit power as compared to an antenna mounted near the speaker (i.e., closer to the user's ear). Certain embodiments described herein select the antenna configuration based on the SAR index of a plurality of antennas.

Figure 1:
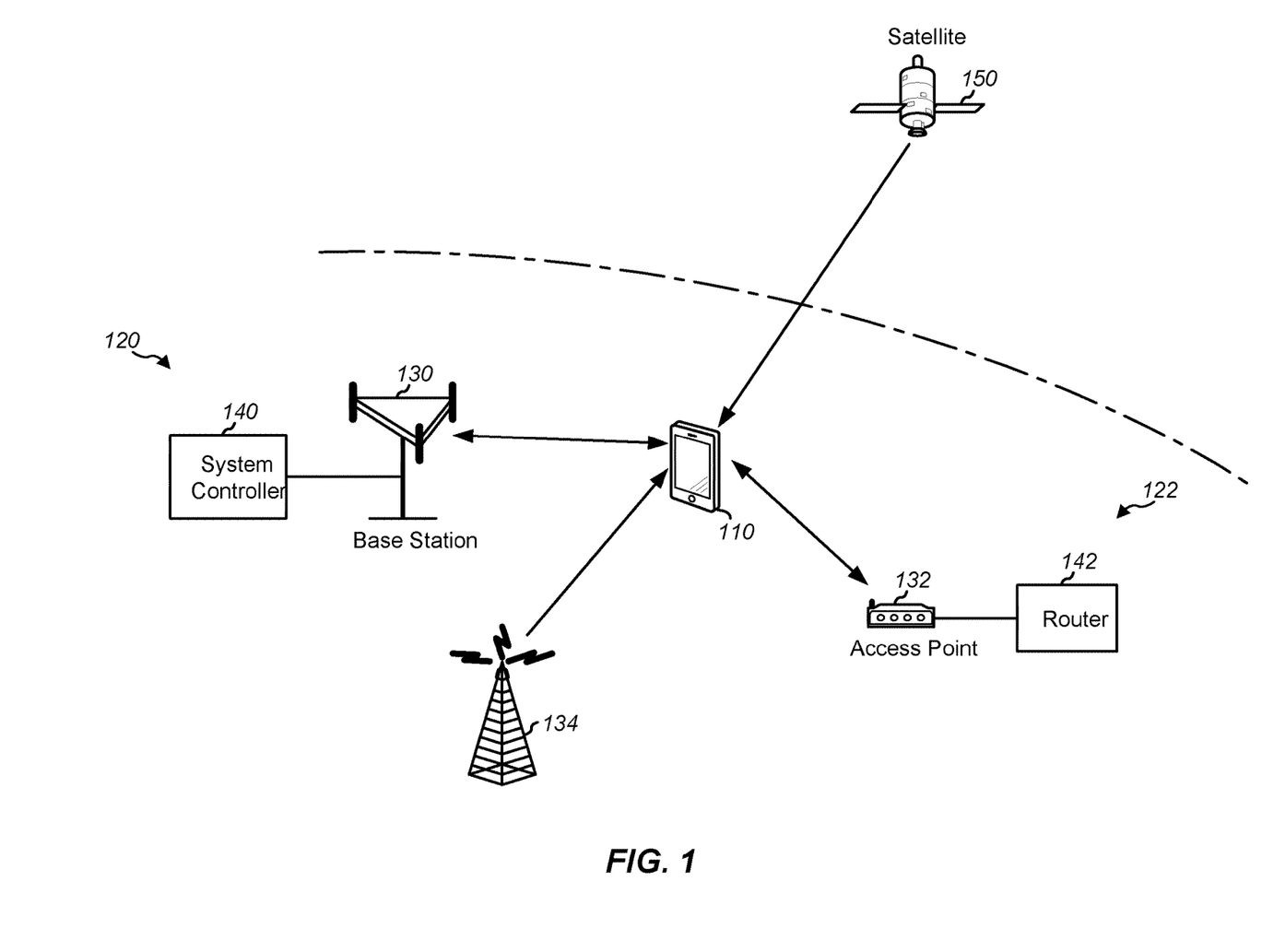
FIG. 1 shows a wireless device capable of communicating with different wireless communication systems.

Referring to FIG. 1, a wireless device 110 capable of communicating with different wireless communication systems 120 and 122 is shown. Wireless system 120 may be a Code Division Multiple Access (CDMA) system (which may implement Wideband CDMA (WCDMA), cdma2000, or some other version of CDMA), a Global System for Mobile Communications (GSM) system, a Long-Term Evolution (LTE) system, 5G system, etc. The wireless system 120 may be configured to support inter-band and intra-band, which may be contiguous or non-contiguous, carrier aggregation. Wireless system 122 may be a wireless local area network (WLAN) system, which may implement IEEE 802.11, etc. For simplicity, FIG. 1 shows wireless system 120 including one base station 130 and one system controller 140, and wireless system 122 including one access point 132 and one router 142. In general, each system may include any number of stations and any set of network entities.

Wireless device 110 may also be referred to as a user equipment (UE), a mobile device, a mobile station, a terminal, an access terminal, a subscriber unit, a station, etc. Wireless device 110 may be a cellular phone, a smart phone, a tablet, a wireless modem, a personal digital assistant (PDA), a handheld device, a wearable device, a laptop computer, a smartbook, a netbook, a cordless phone, a wireless local loop (WLL) station, a Bluetooth device, etc. Wireless device 110 may be equipped with any number of antennas. Multiple antennas may be used to provide better performance, to simultaneously support multiple services (e.g., voice and data), to support carrier aggregation schemes, to provide diversity against deleterious path effects (e.g., fading, multipath, and interference), to support multiple-input multiple-output (MIMO) transmission to increase data rate, and/or to obtain other benefits. Wireless device 110 may be capable of communicating with wireless system 120 and/or 122. Wireless device 110 may also be capable of receiving signals from broadcast stations (e.g., a broadcast station 134). Wireless device 110 may also be capable of receiving signals from satellites (e.g., a satellite 150 in one or more global navigation satellite systems (GNSS)).

In general, wireless device 110 may support communication with any number of wireless systems, which may employ any radio technologies such as WCDMA, cdma2000, LTE, 5G, GSM, 802.11, GPS, etc. Wireless device 110 may also support operation on any number of frequency bands.

Wireless device 110 may support operation at different frequency bands (e.g., low, medium, high). For example, wireless device 110 may operate at one or more frequencies in the LTE band plan. The wireless device 110 may include an antenna system to support operation at millimeter-wave frequencies. The antenna system may include a number of antenna elements, with each antenna element being used to transmit and/or receive signals. The terms "antenna" and "antenna element" are synonymous and are used interchangeably herein. Generally, each antenna element may be implemented with a patch antenna or a strip-type antenna, or another type of antenna. A suitable antenna type may be selected for use based on the operating frequency of the wireless device, the desired performance, etc. Other radiator geometries and configurations may also be used. For example strip-shape antennas such as single-end fed, circular, and differential fed structures may be used.

Figure 2:
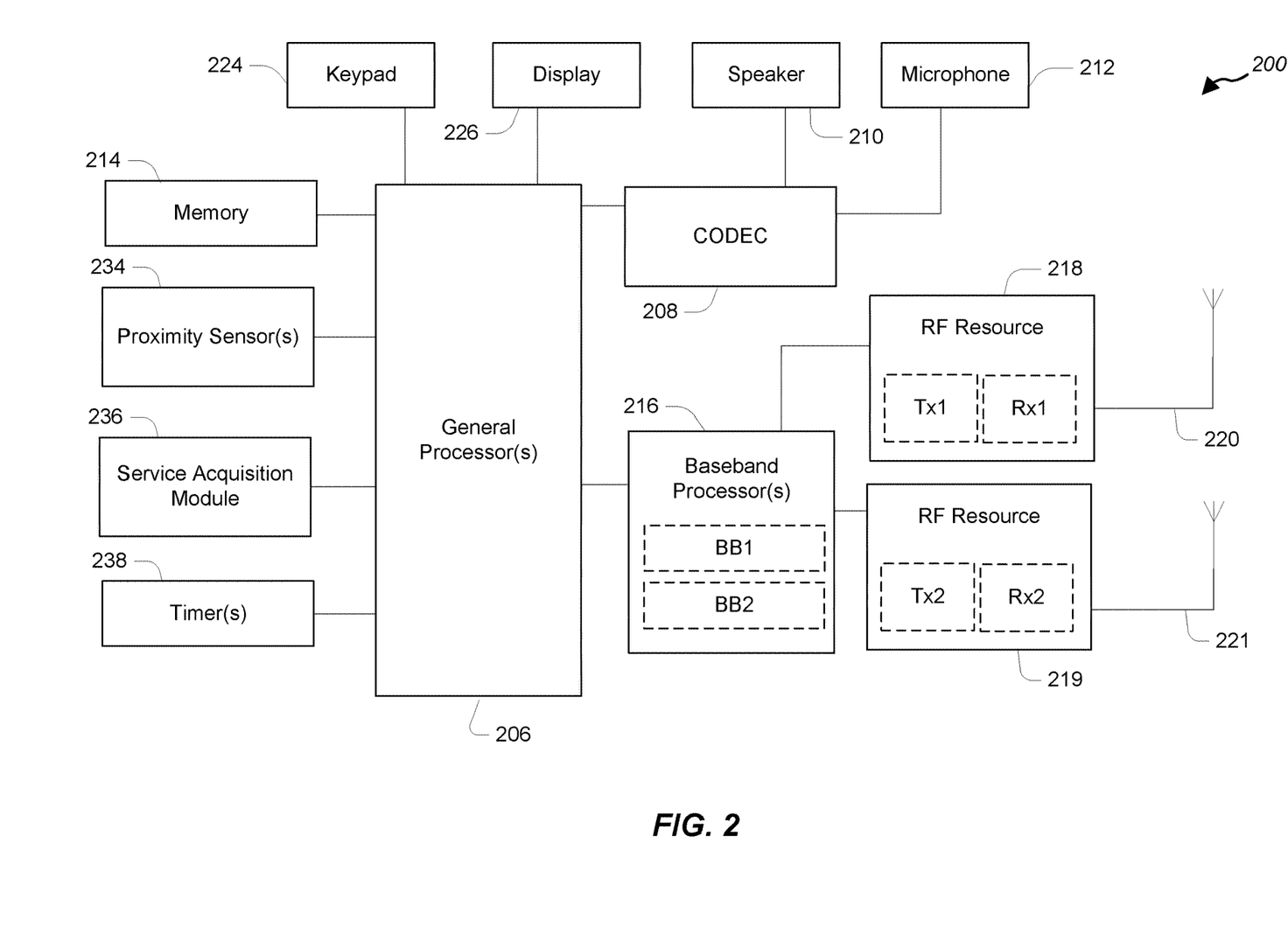
FIG. 2 is a component block diagram of an example multi-antenna mobile device.

Referring to FIG. 2, a functional block diagram of a multi-antenna mobile device 200 is shown. The mobile device 200 may be a wireless device 110 as described in FIG. 1. The multi-antenna mobile device 200 includes at least one controller, such as one or more general processors 206, which may be coupled to a coder/decoder (CODEC) 208. The CODEC 208 may be coupled to a speaker 210 and a microphone 212. The general processor 206 may also be coupled to at least one memory unit 214. The memory unit 214 may be a non-transitory tangible computer readable storage medium that stores processor-executable instructions. The memory unit 214 may store operating system (OS), as well as user application software and executable instructions. The memory unit 214 may also store application data, such as an array data structure.

The general processor 206 and the memory unit 214 may each be coupled to at least one baseband modem processor 216. The baseband modem processor 216 may be configured to schedule and output data to one or more RF resources 218, 219. Each baseband-RF resource chain may include the baseband modem processor 216 to perform baseband/modem functions for communications on a band, and one or more radios, amplifiers and antennas, referred to generally herein as RF resources 218, 219. In one embodiment, baseband-RF resource chains may share a common baseband modem processor 216 (i.e., a single device that performs baseband/modem functions for all bands on the wireless device). Alternatively, each baseband-RF resource chain may include physically or logically separate baseband processors (e.g., BB1, BB2). In general, for inter-band and intra-band non-contiguous carrier aggregation implementation, each component carrier includes an independent transmit chain including independent RF transceiver paths (including independent mixers), and power amplifiers. The antenna configuration may also be separated if the carrier aggregation is enabled. The antennas may be specifically tuned based on the frequency plan (i.e., an antenna may be tuned for one of a low, medium, or high band).

The RF resources 218, 219 may each be communication circuits or transceivers that perform transmit/receive functions for an associated frequency band in wireless device. The RF resources 218, 219 may be communication circuits that include separate transmit and receive circuitry, or may include a transceiver that combines transmitter and receiver functions. The RF resources 218, 219 may be coupled to a wireless antenna (e.g., a first wireless antenna 220 and a second wireless antenna 221). The RF resources 218, 219 may also be coupled to the baseband modem processor 216. While only two RF resources are depicted in FIG. 2, a mobile device may have more than two RF resources and corresponding antenna systems. In some embodiments, all or portions of the RF resource 218 are separate and/or independent from the RF resource 219, but both the RF resources 218 and 219 and embodied in one integrated circuit or on one chip. In other embodiments, the RF resources 218 and 219 are implemented on separate chips or in separate ICs.

In some embodiments, the keypad 224, touch screen display 226, microphone 212, or a combination thereof, may perform the function of receiving the request to initiate an outgoing call. For example, the touch screen display 226 may receive a selection of a contact from a contact list or receive a telephone number. In another example, either or both of the touch screen display 226 and the microphone 212 may perform the function of receiving a request to initiate an outgoing call. For example, the touch screen display 226 may receive selection of a contact from a contact list or receive a user input of a telephone number. As another example, the request to initiate the outgoing call may be in the form of a voice command received via the microphone 212.

The multi-antenna mobile device 200 may also include a service acquisition module 236, one or more timers 238 (e.g., a no service timer or a power save mode timer) and/or a power supply (not shown). The power supply may be battery-powered, although the techniques described herein may be applicable to devices that are not battery-powered. The service acquisition module 236 is primarily responsible for determining the technology, channels/bands, and/or service provider that the multi-antenna mobile device 200 should use. The service acquisition module 236 is also capable of determining when the multi-antenna mobile device 200 is operating out-of-service. The service acquisition module 236 sends service requests to the general processor 206. The general processor 206 then controls the baseband modem processor 216 and RF Resource 218, 219 used to transmit the service requests via the antenna 220, 221 to any nearby base station. The service requests identify one or more frequency bands supported by the mobile device 200.

The multi-antenna mobile device 200 may also include one or more proximity sensors 234 configured to detect the presence of a user. For example, the proximity sensors 234 may be an infrared (IR) sensor configured to detect the presence of a human ear. Other capacitive sensors based designs may also be used to detect the presence of a user. The proximity sensors may be used to initiate or terminate a transmit power back-off algorithm in an effort to reduce the SAR.

When the processor 206 determines that transmit power back-off data prioritization should occur (e.g., based on a state of the proximity sensors 234), the processor may direct the baseband modem processor 216 to schedule data packets based on the resulting transmitter power available to each of the antennas 220, 221. For example, in operation, the baseband modem processor may be configured to prepare information for transmission at a mid-band frequency (e.g., LTE band 3), and at a high-band frequency (e.g., LTE band 7). The mid-band is configured to transmit via RF resource 218 and through antenna 220. The high-band is configured to transmit via RF resource 219 and through antenna 221. In an example scenario, a voice or high QoS data stream may be initially configured to transmit via the high-band (e.g., RF resource 219 and antenna 221). Based on information received from the proximity sensors 234 and the antenna placement, the mobile device 200 may have a SAR index value of 1 for the mid-band antenna 220. A SAR index value of 1 may equate to a transmit power back-off of approximately 2 dB for the mid-band antenna 220. Similarly, the mobile device 200 may have a SAR index value of 2 for the high-band antenna 221, which may equate to a transmit power back-off by 4 dB for the high-band antenna 221. In this case, the baseband modem processor 216 is configured to determine that the transmit power back-off for the high-band antenna 221 is greater than the transmit power back-off for the mid-band antenna 220. An algorithm executing in the baseband modem processor 216 is configured to change the scheduling to ensure the voice or high QoS data is transmitted via the mid-band antenna 220 instead of the default configuration of the high-band antenna 221.

In some embodiments, the general processor 206, the memory unit 214, the baseband modem processor(s) 216, and the service acquisition module 236 may be included in the multi-antenna mobile device 200 as a system-on-chip. Further, various input and output devices may be coupled to components on the system-on-chip, such as interfaces or controllers. In some embodiments, the RF resources 218, 219 are included in the mobile device 200 in one or more other chips, dies, or discrete components, and may be coupled to the system-on-chip, for example, via said interfaces or controllers.

Figure 3:
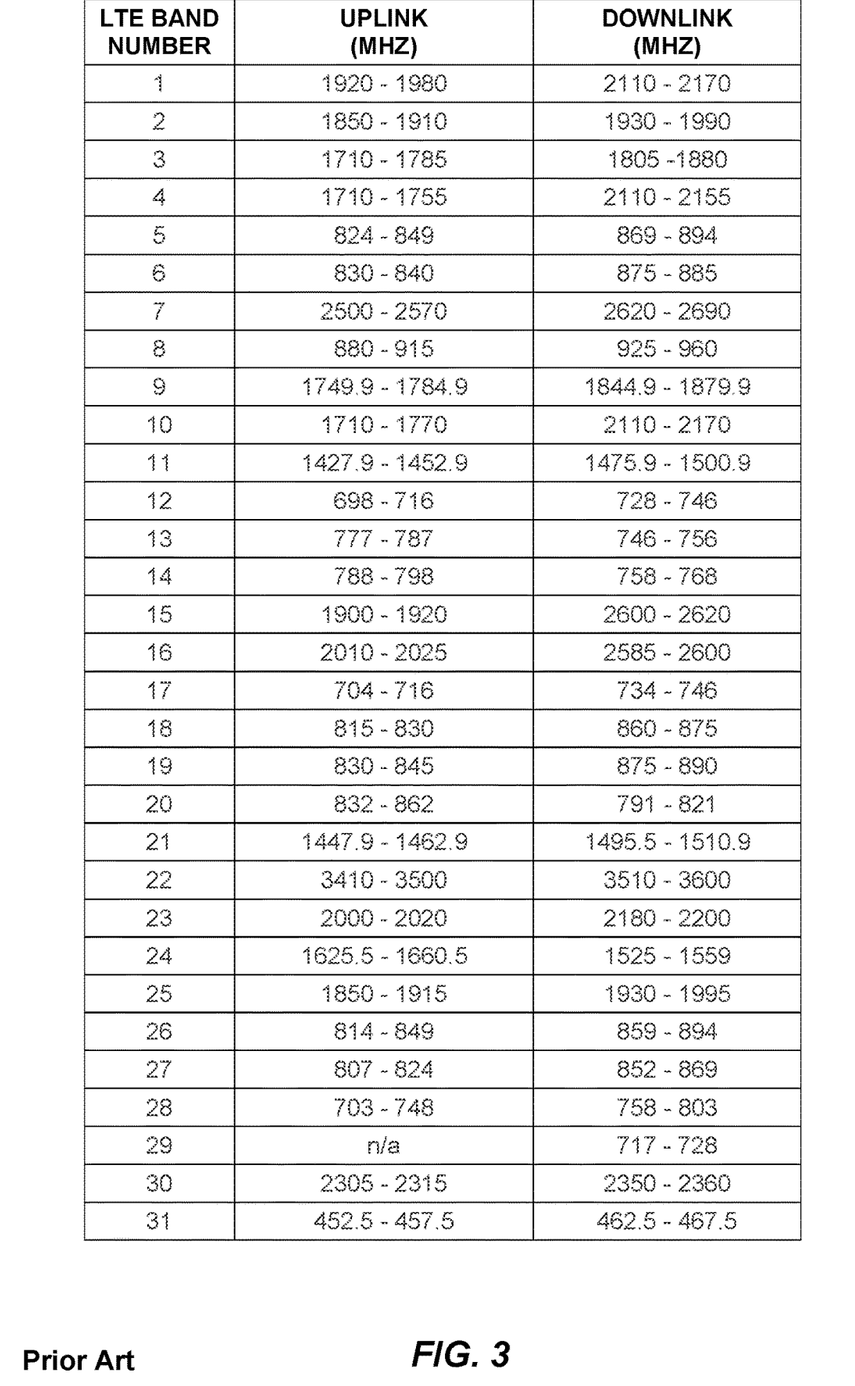
FIG. 3 is an example band plan for wireless devices.

Referring to FIG. 3, an example band plan for a wireless device is shown. The band plan identifies an LTE band number and the associated uplink and downlink frequencies. The band plan is an example only and not a limitation. The range of the frequency spectrum may impact the design of the antennas in a mobile device. For example, an antenna may be configured to be resonant (e.g., have a reduce standing wave ratio) for only a limited portion of the spectrum. In general, an antenna may be configured to operate based on carrier signals in the lower portion of the spectrum (e.g., <1200 MHz), the middle portion of the spectrum (e.g., between 1200 and 2200 MHz), or the high portion of the spectrum (e.g., >2200 MHz). A mobile device may be configured to communicate with other stations via multiple bands. In an embodiment, the multiple communication paths form a carrier aggregation scheme to increase the data bandwidth of the overall (i.e., combined) communication link. Different geographic wireless markets may employ different combinations of the low, medium and high portions of the spectrum (i.e., low, med, and high bands).

Figure 4A:
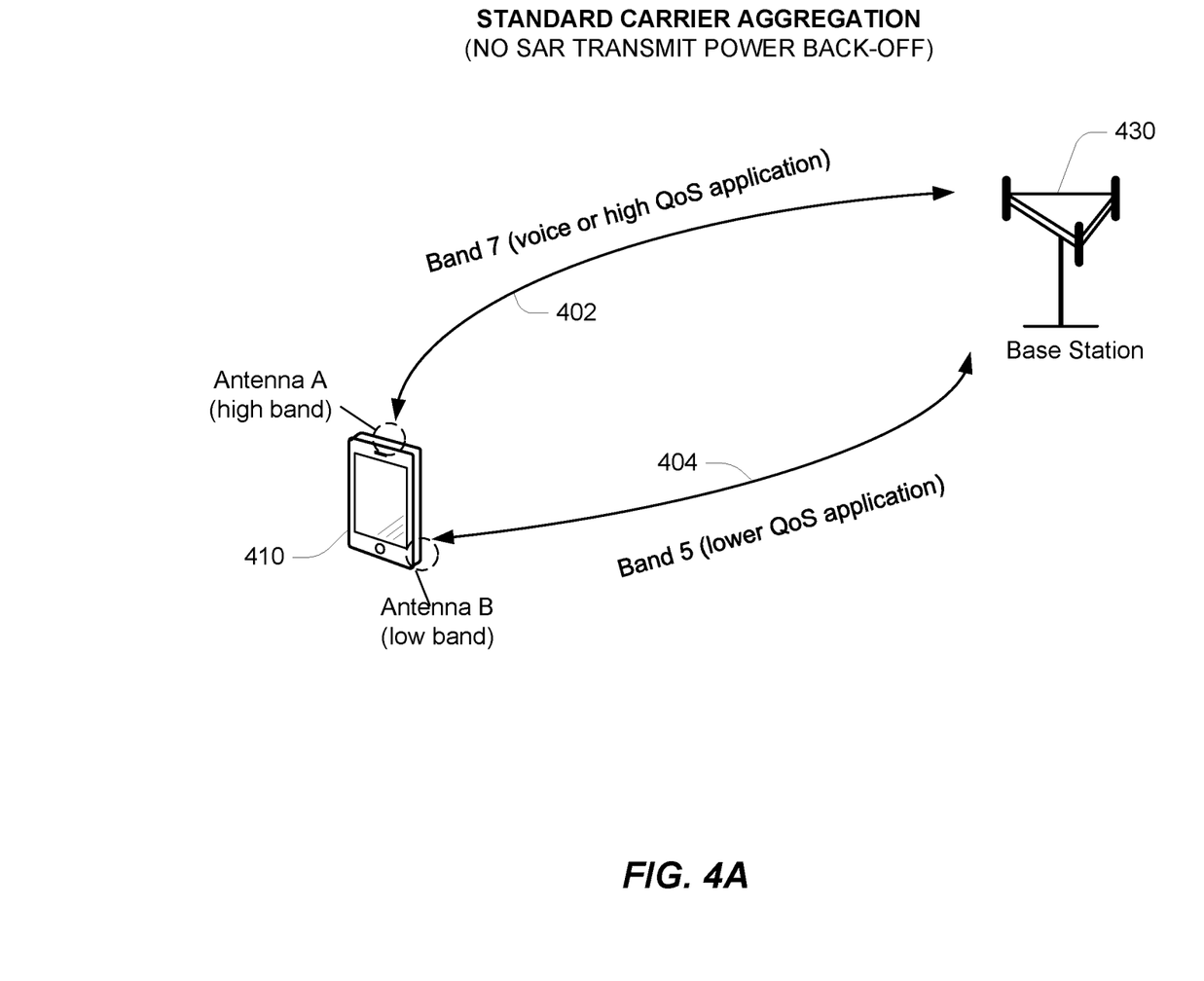
FIG. 4A illustrates an example communication processes using standard carrier aggregation without transmit power back-off.

Referring to FIG. 4A, with further reference to FIG. 2, an example communication process using standard carrier aggregation without transmit power back-off is shown. The process includes a mobile device 410 and a base station 430. The mobile device 410 is an example of a multi-antenna device 200, and includes a high band antenna A and a low band antenna B. The base station 430 may employ a radio technology such as LTE and is configured to communicate on multiple channels. As used herein, the terms channel and carrier may be used synonymously. For example, the mobile device 410 and the base station 430 may establish a first communication channel (or carrier) 402 and a second communication channel (or carrier) 404. The first communication channel 402 may be in band 7 (i.e., 2500-2570 MHz), and the second communication channel 404 may be in band 5 (e.g., 824-849 MHz). These bands are exemplary only and not a limitation as other band combinations may be used. In an embodiment, the mobile device 410 and the base station 430 may establish communication links on 3, 4, 5, or more different bands. The mobile device 410 includes a first RF resource 218 operably coupled to the high band antenna A, and a second RF resource 219 operably coupled to the low band antenna B. One or more baseband modem processors 216 are configured to schedule the data packets to be transmitted via either the high band antenna A or the low band antenna B. For example, the baseband modem processor 216 may be configured to schedule voice data (or data from another high QoS application; in some embodiments, medical or health data is scheduled as high QoS) over the first communication channel 402 which is configured for band 7 via the high band antenna A. The baseband modem processor 216 may also schedule data associated with a lower QoS application (e.g., mail files, SMS message files, media application data transfer, etc.) over the second communication channel 404 which is configured for band 5 via the low band antenna B. Accordingly, the mobile device 410 may utilize a carrier aggregation scheme to prioritize the sending and receiving of voice data via the high band antenna A while simultaneously utilizing the low band antenna B to transfer data.

Figure 4B:
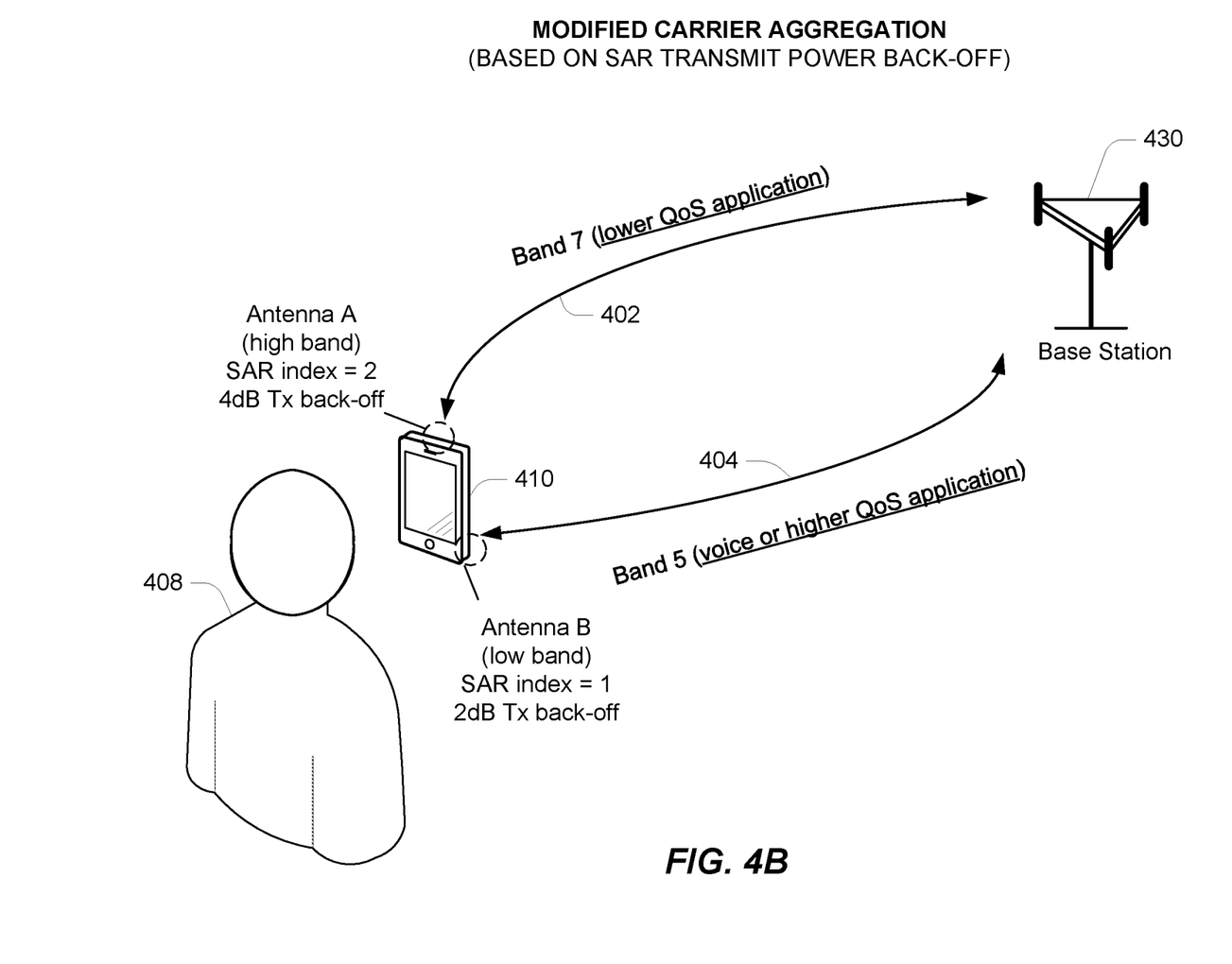
FIG. 4B illustrate an example communication process using modified carrier aggregation resulting from transmit power back-off.

Referring to FIG. 4B, with further reference to FIG. 4A, an example communication process using modified carrier aggregation resulting from transmit power back-off is shown. Continuing the example provided for FIG. 4A, the proximity sensors 234 in the mobile device 410 detect the presence of a user 408. The presence of the user 408 triggers the implementation of transmit power back-off based on the SAR index values associated with each of the high band antenna A and the low band antenna B. For example, the SAR index value for the high band antenna A may be equal to 2. The processor 206 may be configured to instruct the first RF resource to reduce the transmit power by 4 dB based on the SAR index value of 2. Similarly, the SAR index value for the low band antenna B may be equal to 1. The processor 206 may be configured to instruct the second RF resource to reduce transmit power by 2 dB based on the SAR index value of 1. The SAR index values and corresponding transmit power back-off values are exemplary only and not limitations as other index and back-off values may be used. The baseband modem processor 216 is configured to determine which of the communication channels 402, 404 is capable of supporting higher transmit power after the power back-off limitations are applied. In this case, power back-off applied to the low band antenna B is less than the power back-off applied to the high band antenna A. As a result, the low band antenna B may operate with a higher transmit power. The baseband modem processor 216 is configured to prioritize the data scheduling based on the available transmit power such that the higher power communication channel is utilized for the voice date (or data for a higher QoS application) and the lower power communication channel is used for the lower QoS application. In this example, after the user 408 is detected and the transmit power back-off values are applied, the baseband modem processor 216 begins to utilize the low band antenna B and the second communication channel 404 (i.e., band 5) for the voice data, and the high band antenna A and the first communication channel 402 (i.e., band 7) for the lower QoS application data. In an example, the baseband modem processor 216 may be configured to prioritize the data scheduling based on the resulting transmit power after applying the respective SAR index and the corresponding transmit power back-off values. In an example, the baseband modem processor 216 may be configured to prioritize the data scheduling based only on the SAR index or the corresponding transmit power back-off values without regard to the resulting transmitter power (e.g., the transmitter power levels may not be equal prior to applying a transmit power back-off).

Figure 5:
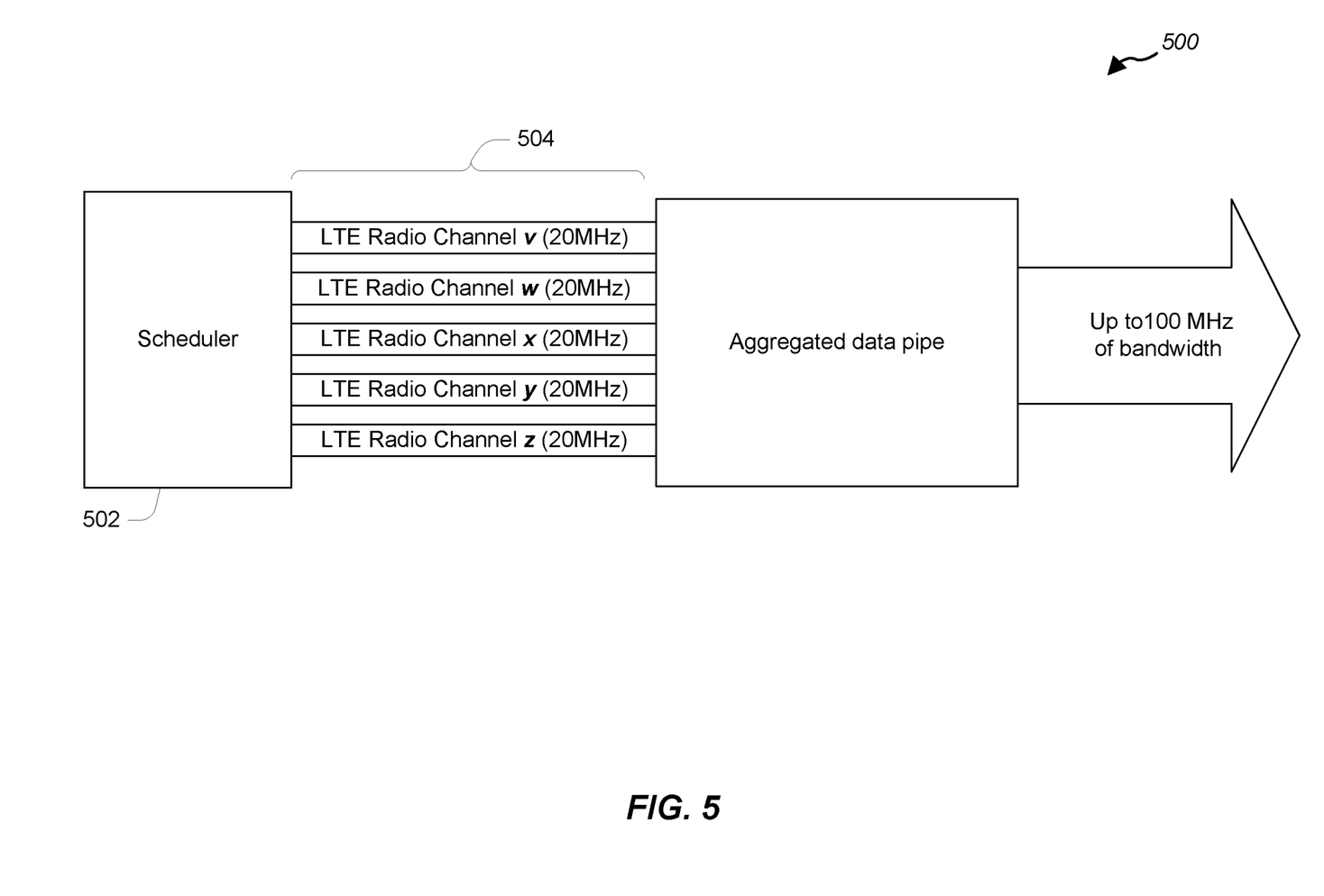
FIG. 5 is a block diagram of an example scheduler in a carrier aggregation process.

Referring to FIG. 5, with further reference to FIG. 2, a block diagram of an example scheduler in a carrier aggregation process 500 is shown. A scheduler 502 may be implemented within the baseband modem processor 216 and configured to prioritize the transmission of data packets through a plurality of RF resources based on transmit power back-off values. The carrier aggregation may be intra-band with contiguous component carriers, intra-band with non-contiguous component carriers, and inter-band. In intra-band contiguous carrier aggregation, an aggregated channel can be considered as a single enlarged RF channel which is transmitted and received with a single RF Resource. In intra-band non-contiguous and inter-band carrier aggregation, the aggregated channels generally require the use of additional transceivers. In an LTE system the bandwidth of several 20 MHz channels 504 maybe aggregated to provide higher data rates (e.g., 100 MHz). The scheduler 502 is configured to schedule the data across the carriers and provide an indication of data transfer rates for the different carriers. A carrier aggregation scheme may include multiple RF resources (e.g., RF resources 218, 219) to provide the uplink and downlink capabilities of the several 20 MHz channels 504. Each of the RF resources may be coupled to an antenna that is susceptible to SAR related transmit power back-off requirements based on the relative locations of an antenna system and a user. The scheduler 502 is configured to prioritize the data scheduling based on the resulting transmit power back-off. For example, if the LTE Radio Channels 'v' and 'w' are subject to a transmit power back-off of 4 dB, and the LTE Radio Channels 'x', 'y' and 'z' are subject to a transmit power back-off of 2 dB, the scheduler 502 is configured to provide voice data, or other high QoS data, to the RF resources associated with the LTE Radio Channels 'x', 'y' and 'z'.

Figure 6:
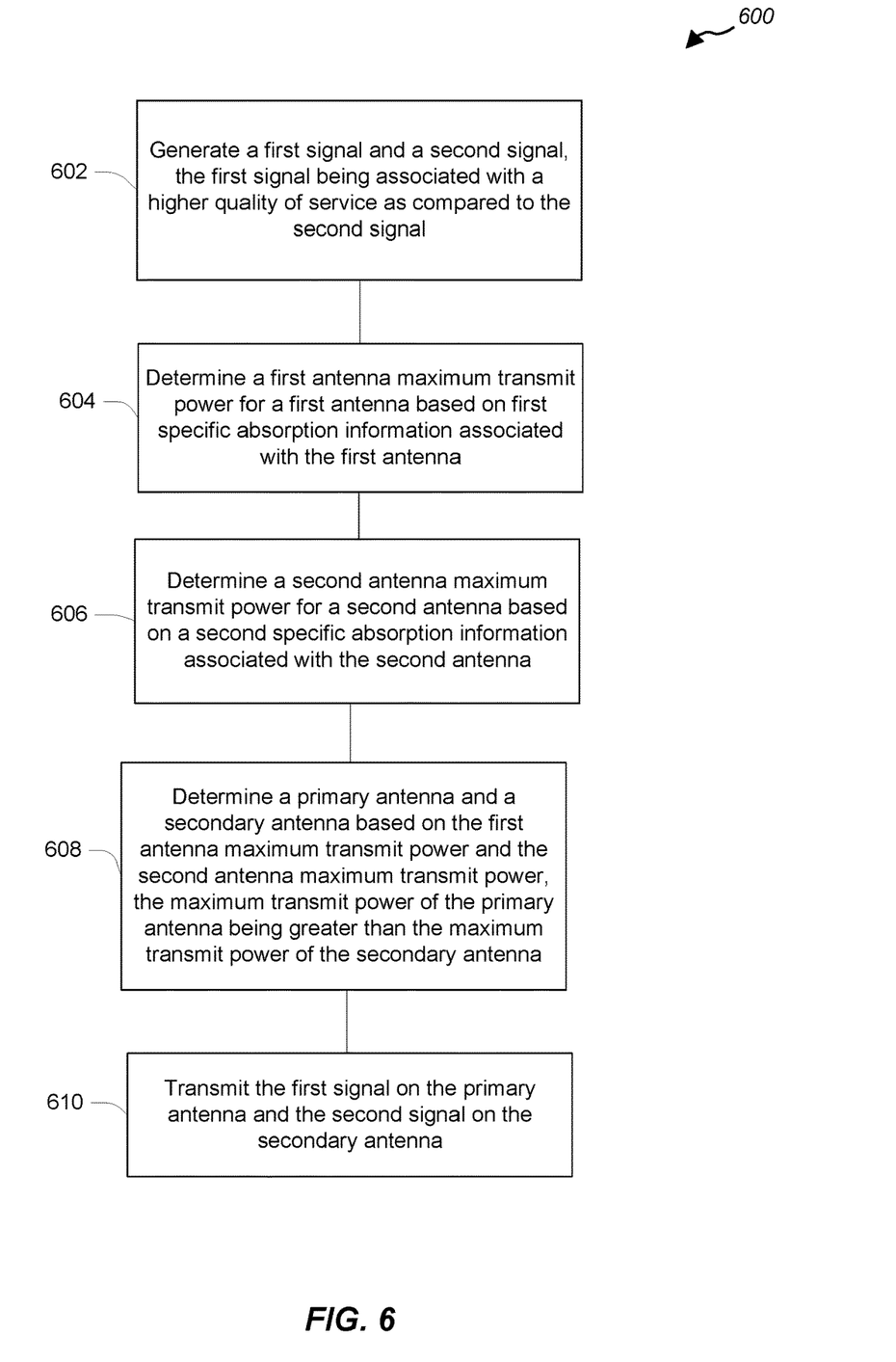
FIG. 6 is an example block flow diagram for a method of mitigating the impact of transmitter power back-off in a mobile device.

Referring to FIG. 6, with further reference to FIG. 1-5, a method 600 of mitigating the impact of transmitter power back-off in a mobile device includes the stages shown. The method 600 is, however, an example only and not limiting. The method 600 may be altered, e.g., by having stages added, removed, rearranged, combined, performed concurrently, and/or having single stages split into multiple stages. The baseband modem processor 216 and the RF resources 218, 219 may be a means for performing the method 600.

At stage 602, the method includes generating a first signal and a second signal, the first signal being associated with a higher quality of service as compared to the second signal. Referring to FIG. 4A, the mobile device 410 is configured to communicate with the base station 430 with a first signal (e.g., the high QoS signal) and a second signal (e.g., the low QoS signal). For example, high QoS signal utilizes a first frequency band (e.g., band 7) and lower QoS signal utilizes a second frequency band (e.g., band 5). The baseband modem processor 216 is configured to schedule high QoS data packets (e.g., voice, video) via a first RF resource which includes the high band antenna A, and the low QoS data packets via a second RF resource which includes the low band antenna B. The indications of high band and low band RF resources are exemplary only as an RF resource may be tuned to other bands (e.g., FIG. 3).

At stage 604, the method includes determining a first antenna maximum transmit power for a first antenna based on first specific absorption information, for example a SAR index value, associated with the first antenna. One or more proximity sensors 234 in the mobile device 410 may be used to detect the presence of a user. The general processor 206 may be configured to determine a specific absorption rate (SAR) index value for each of the RF resources 218, 219 based on information or signals from the sensors 234. The SAR index value may be based on factors such as, for example, the location of an antenna within the mobile device, antenna orientation/configuration, and frequency, in relation to the proximity of the user. The SAR index value is correlated with a transmit power back-off value. The SAR index values and the corresponding transmit power back-off values for the antennas may be stored in a look-up-table or other data structure in the memory unit 214. For example, as depicted in FIG. 4B, the high band antenna A may have a SAR index value of 2, which correlates to a transmit power back-off value of 4 dB for antenna A. As a result, the baseband modem processor 216 is configured to lower the maximum transmit power for signals radiating through antenna A (i.e., the first antenna) by at least 4 dB. In some embodiments, the processor 206 and/or the baseband modem processor 216 is configured to determine a maximum transit power or a transmit power back-off value based on the information related to SAR described above without calculating a specific index value.

At stage 606, the method includes determining a second antenna maximum transmit power for a second antenna based on second specific absorption information, for example a SAR index value, associated with the second antenna. The general processor 206 is configured to determine a SAR index value and the corresponding transmit power back-off value for each RF resource in the mobile device based on the presence of the user. Continuing the example in FIG. 4B, the general processor 206 determines that the low band antenna B as a SAR index value of 1 and a corresponding transmit power back-off value of 2 dB. The baseband modem processor 216 lowers that maximum transmit power for antenna B (i.e., the second antenna) by at least 2 dB.

At stage 608, the method includes determining a primary antenna and a secondary antenna based on the first antenna maximum transmit power and the second antenna maximum transmit power, the maximum transmit power of the primary antenna being greater than the maximum transmit power of the secondary antenna. The baseband modem processor 216 determines which of the RF resources 218, 219 and the corresponding antennas 220, 221 are capable of higher power output relative to one another after the transmit power back-off amounts are applied. Continuing the example in FIG. 4B, after the 4 dB and 2 dB transmit power back-off values are applied to antenna A and antenna B, respectively, the baseband modem processor 216 determines that antenna B (i.e., the RF resource with the relatively lower transmit power back-off value) is the primary antenna, and that antenna A (i.e., the RF resource with the relatively higher power back-off value) is the secondary antenna.

At stage 610, the method includes transmitting the first signal on the primary antenna and the second signal on the secondary antenna. The baseband modem processor 216 is configured to prioritize the data streams based on the quality of service requirements. Typically, voice and streaming video data streams are considered high quality of service, and data transfers (email messages and attachments, media files, etc.) may be considered as requiring a lower quality of service connection. The baseband modem processor 216 may initially configure the alignment of the data streams and the available RF resources based on the quality of service requirements and the current capabilities of the RF resources. In an example, the baseband modem processor 216 may reconfigure the alignment of data streams if the SAR values change due to a change in orientation and/or relative distance between the mobile device and the user. As depicted in FIG. 4B, the baseband modem processor 216 realigns the data streams such that the data for a voice or higher QoS application (i.e., the first signal) will utilize antenna B (i.e., the primary antenna), and data for the lower QoS application (i.e., the second signal) will utilize antenna A (i.e., the secondary antenna). The use of the first communication channel 402 (i.e., band 7) and the second communication channel 404 (i.e., band 5) is an example only and not a limitation as antenna A and antenna B may be configured to operate on other bands. Additional carrier aggregation schemes with more than two intra-band and/or inter-band carriers may be used. While examples with two data streams and two bands are described above, the baseband modem processor 216 may be configured to prioritize two or more data streams across two or more antennas based on the impact of the transmit power back-off requirements on the antennas and associated channels.

Figure 7:
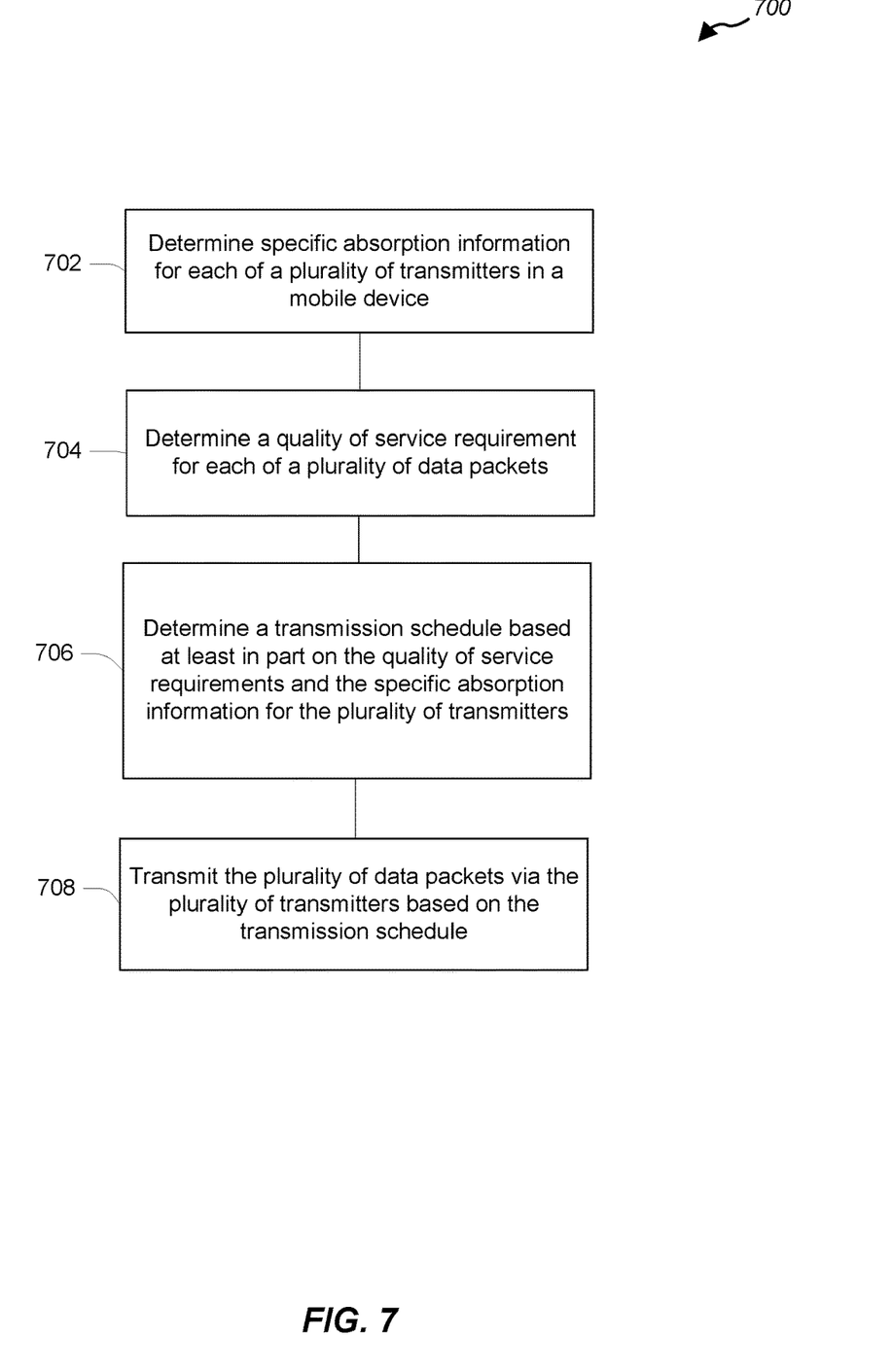
FIG. 7 is an example block flow diagram for a method of transmitting data in a carrier aggregation scheme.

Referring to FIG. 7, with further reference to FIG. 1-5, a method 700 of transmitting data in a carrier aggregation scheme includes the stages shown. The method 700 is, however, and example only and not limiting. The method 700 may be altered, e.g., by having stages added, removed, rearranged, combined, performed concurrently, and/or having single stages split into multiple stages. The baseband modem processor 216 and the RF resources 218, 219 may be a means for performing the method 700.

At stage 702, the method includes determining specific absorption information for each of a plurality of transmitters in a mobile device. The specific absorption information may include SAR index values as well as power values, such as a maximum power value or a power back-off value. The general processor 206 and the memory unit 214 may be means for determining a specific absorption information. For example, each RF resource in a mobile device may be assigned a SAR value index, and a corresponding transmit power back-off value, based on the location, configuration, frequency, and power capabilities of the RF resource. In general, the RF resources with antenna elements located near the ear of a user will have a high SAR index value and a higher transmit power back-off requirement. The SAR information may be stored in the memory unit 214 as one or more data structures (e.g., fields, records, variables, etc.) and accessed by the general processor 206. The one or more proximity sensors 234 may be used to trigger the implementation of the transmit power back-off for one or more of the RF resources. Other sensors and input devices (e.g., touch pad, keypad, microphone, accelerometers, etc.) may also be used to detect the presence of a user. The current specific absorption rate and/or the corresponding transmit power back-off value are available to the baseband modem processor 216 to enable the prioritization of data packets. As used herein, a term data packet may refer to a basic unit of communication over a digital network. Other examples of data packets may include terms such as a datagram, a segment, a block, a cell, or a frame depending on the protocol used for the transmission of the data.

At stage 704, the method includes determining a quality of service requirement for each of a plurality of data packets. Each data packet may be associated with a voice application (e.g., wireless phone), video applications (e.g., video conference call, streaming media), or other applications (e.g., mapping, email, messaging, data transfer, etc.). Some applications may require a higher quality of service to improve the user experience. For example, a voice application generally requires a higher quality of service because a low quality of service may result in lost voice segments (e.g., static, unrecognizable audio, lag due to data retransmission, or dropped calls). Similarly, streaming applications may require a higher quality of service to provide a user with a positive experience (e.g., lower block error rates), and health of medical applications may require a higher quality of service the ensure the wellness of a user. Other applications may provide an appropriate user experience with a lower quality of service. Data downloads or large email files may use a lower quality of service since the user may not be aware of the impact of the time required to correct errors. The baseband modem processor 216 may be configured to associate a relative quality of service requirement based on the demands of the applications executing on the mobile device. As an example, voice communications and health or medical data may be identified as high quality of service, streaming video may require a medium quality of service, and data downloads may utilize a lower quality of service. The quality of service requirements may be indicated within the application (e.g., included in a data packet) or identified by the general processor 206 (e.g., stored in a look-up table) and provided to the baseband modem processor 216.

At stage 706, the method includes determining a transmission schedule based at least in part on the quality of service requirements and the specific absorption information for the plurality of transmitters. The baseband modem processor 216 is configured to generate a transmission schedule to prioritize each of the data packets such that the packets which require a high quality of service will utilize a transmitter with a relatively lower specific absorption rate index value (e.g., and the corresponding lower transmit power back-off value). In a carrier aggregation scheme, such as depicted in FIG. 5, the baseband modem processor 216 may have a plurality of available carriers and/or channels on one or more frequency bands. In some cases, one or more channels may not be suited for specific data types based on bandwidth requirements or other considerations. The baseband modem processor 216 is configured to prioritize the data packets such that appropriate RF resources are utilized to meet various quality of service requirements. When a user is present, and the SAR based transmit power back-off requirements are implemented, the service capabilities of the channels may change. The baseband modem processor 216 is configured to change the transmission schedule based on the current service capabilities. In general, the transmission schedule will route the data packets requiring a high quality of service to the RF resources with the highest output power.

At stage 708, the method includes transmitting the plurality of data packets via the plurality of transmitters based on the transmission schedule. The baseband modem processor 216 is configured to send and receive data packets via one or more RF resources 218, 219. The transmission schedule may be altered as a user changes the relative position of the mobile device and the corresponding SAR transmit power back-off values are implemented. Referring to FIGS. 4A and 4B, a transmission schedule may initially provide the high quality of service data packets to the RF resources associated with the first communications channel 402. When the user 408 is detected, and the SAR based transmit power back-off values are applied, the transmission schedule may change to provide the high quality of service data packets to the RF resources associated with the second communications channel 404. Continuing the example further, if the user 408 moves away from the mobile device 410 (i.e., is no longer detected by the presence sensors), the SAR transmit power back-off values may be negated, and the transmission schedule may revert back to the initial state such that the high quality of service data packets utilize the RF resources associated with the first communications channel 402.

Figure 8:
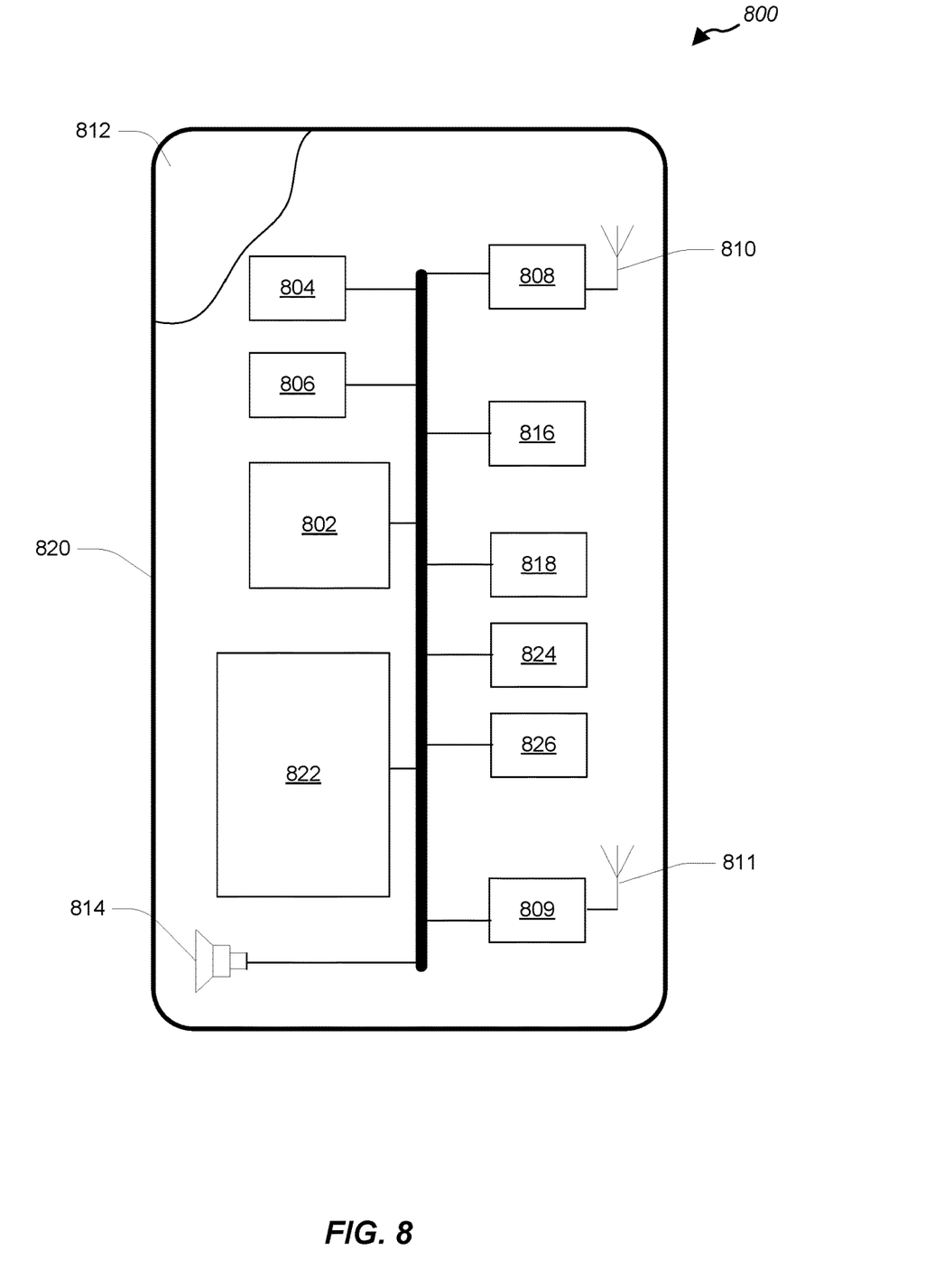
FIG. 8 is a component diagram of an example-multi antenna mobile device.

Referring to FIG. 8, a component diagram of an example-multi antenna mobile device 800 is shown. The multi-antenna mobile device 800 may be a mobile device 200 depicted in FIG. 2 and/or with any of a variety of other multi-antenna mobile devices, such as a tablet computer, laptop computer, desktop computer or other multi-antenna mobile device. In various aspects, the multi-antenna mobile device 800 may include a processor 802 coupled to a touch screen controller 804 and an internal memory 806. The processor 802 may be one or more multicore ICs designated for general or specific processing tasks. The internal memory 806 may be a non-transitory processor-readable storage medium comprising volatile or non-volatile memory, such as NAND. The processor 802 may be coupled to a touch screen controller 804. The touch screen controller 804 and the processor 802 may be coupled to a touch screen panel 812, such as a resistive-sensing touchscreen, capacitive-sensing touchscreen, infrared sensing touchscreen, etc. Alternatively, the various aspects may be implemented in and/or with any of a variety of devices that do not include a touchscreen controller, touchscreen, or any form of screen or direct data interface, such as a data card, wireless hotspot device, network component, peripheral memory device or similar "headless" devices. The multi-antenna mobile device 800 may have one or more radio signal transceivers 808, 809 (e.g., PEANUT, BLUETOOTH, ZIGBEE, Wi-Fi, RF radio) and antennas 810, 811 for sending and receiving, coupled to each other and/or to the processor 802. The transceivers 808 and antenna 810 may be used with the above-mentioned circuitry to implement the various wireless transmission protocol stacks and interfaces. The multi-antenna mobile device 800 may include one or more cellular network wireless modem chips 816 coupled to the processor and enabling communication via one or more cellular networks. The multi-antenna mobile device 800 may include a peripheral device connection interface 818 coupled to the processor 802. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown). The multi-antenna mobile device 800 may also include speakers 814 for providing audio outputs. The multi-antenna mobile device 800 may also include a housing 820, constructed of a plastic, metal, or a combination of materials, for containing all or some of the components discussed herein. The multi-antenna mobile device 800 may include a power source 822 coupled to the processor 802, such as a disposable or rechargeable battery. The rechargeable battery may also be coupled to the peripheral device connection port to receive a charging current from a source external to the multi-antenna mobile device 800. The mobile device 800 may include an image sensor 824 (i.e., camera) and light sensor 826.

The processor 802, may include or represent one or more processors (e.g., the processor 802 may represent one or more of general processor 206, baseband modem processor 216, and service acquisition module 236 in FIG. 2). In addition, the processor 802 may be any programmable microprocessor, microcomputer or multiple processor chip or chips that can be configured by instructions (i.e., software instructions, such as applications) to perform a variety of functions, including the functions of the various aspects described above. In some devices may include multiple processors, such as one processor dedicated to wireless communication functions and one processor dedicated to running other applications. Typically, software applications may be stored in the internal memory before being accessed and loaded into the processors. The processors may include internal memory sufficient to store the application instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processor themselves.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, a RAM, a PROM, EPROM, a FLASH-EPROM, any other memory chip or cartridge, a carrier wave as described hereinafter, or any other medium from which a computer can read instructions and/or code.

Various forms of non-transitory computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

What is claimed is:

1. A mobile device, comprising:
   a first radio frequency resource associated with first specific absorption information;
   a second radio frequency resource associated with second specific absorption information;
   at least one processor operably coupled to the first radio frequency resource and the second radio frequency resource and configured to:
      generate a first signal associated with a first quality of service;
      generate a second signal associated with a second quality of service, the second quality of service being less than the first quality of service;
      cause the first signal to be transmitted over one of the first radio frequency resource and the second radio frequency resource based at least in part on the first specific absorption information and the second specific absorption information; and
      cause the second signal to be transmitted over whichever of the first radio frequency resource and the second radio frequency resource is not used to transmit the first signal.

2. The mobile device of claim 1 wherein the first radio frequency resource includes a first transceiver and the second radio frequency resource includes a second transceiver.

3. The mobile device of claim 2 wherein the first transceiver is configured to operate in a first frequency band, and the second transceiver is configured to operate in a second frequency band that is different from the first frequency band.

4. The mobile device of claim 1 further comprising a plurality of proximity sensors operably coupled to the at least one processor and configured to detect a presence of a user, wherein the first specific absorption information and the second specific absorption information are based on information from respective sensors of the plurality of proximity sensors.

5. The mobile device of claim 1 wherein the first signal includes a voice signal.

6. The mobile device of claim 1 wherein the first specific absorption information includes a first power back-off value, and the second specific absorption information includes a second power back-off value.

7. A mobile device, comprising:
   a plurality of transmitters;
   at least one processor operably coupled to the plurality of transmitters and configured to:
      determine specific absorption information for each of the plurality of transmitters;
      determine a quality of service requirement for each of a plurality of data packets;
      determine a transmission schedule based at least in part on the quality of service requirements and the specific absorption information for the plurality of transmitters; and
      transmit the plurality of data packets via the plurality of transmitters based on the transmission schedule,
   wherein one of the plurality of transmitters is associated with a specific absorption information lower than a specific absorption information of one or more other transmitters of the plurality of transmitters, and the transmission schedule indicates that a data packet with a high quality of service requirement is transmitted on the one of the plurality of transmitters based on the lower specific absorption information.

8. The mobile device of claim 7 further comprising at least one proximity sensor operably coupled to the at least one processor and configured to detect a presence of a user.

9. The mobile device of claim 8 wherein the at least one processor is configured to determine the specific absorption information based at least in part on an input from the at least one proximity sensor.

10. The mobile device of claim 7 wherein the at least one processor is configured to determine specific absorption information for each of the plurality of transmitters by determining a transmit power back-off value for each of the plurality of transmitters.

11. The mobile device of claim 10 wherein the at least one processor is configured to determine the transmission schedule based at least in part on the transmit power back-off values for each of the plurality of transmitters.

12. The mobile device of claim 7, the plurality of data packets includes voice data and the quality of service requirement for the voice data is a high quality of service.

13. The mobile device of claim 7 wherein the mobile device is configured to transmit the plurality of data packets using the plurality of transmitters by transmitting the plurality of data packets using inter-band or intra-band non-contiguous carrier aggregation.

14. The mobile device of claim 7 wherein the at least one processor is configured to determine the transmission schedule at least in part by assigning each data packet to a carrier or band of a plurality of carriers or bands based at least in part on the quality of service requirements and the specific absorption information for the plurality of transmitters.

15. A mobile device, comprising:
   a plurality of transmitters;
   at least one processor operably coupled to the plurality of transmitters and configured to:
      determine specific absorption information for each of the plurality of transmitters by determining a transmit power back-off value for each of the plurality of transmitters;
      determine a quality of service requirement for each of a plurality of data packets;
      determine a transmission schedule based at least in part on the quality of service requirements, the specific absorption information for the plurality of transmitters, and the transmit power back-off values for each of the plurality of transmitters; and
      transmit the plurality of data packets via the plurality of transmitters based on the transmission schedule,
   wherein the at least one processor is configured to determine that one of the plurality of transmitters is associated with a relatively low transmit power back-off value, and to schedule a data packet with a high quality of service requirement for transmission on the one of the plurality of transmitters based on the relatively low transmit power-back off value.

16. A method for mitigating an impact of transmitter power back-off in a mobile device, comprising:
   generating a first signal and a second signal, the first signal being associated with a higher quality of service as compared to the second signal;
   determining a first antenna maximum transmit power for a first antenna based on first specific absorption information associated with the first antenna;

determining a second antenna maximum transmit power for a second antenna based on second specific absorption information associated with the second antenna;

determining a primary antenna and a secondary antenna based on the first antenna maximum transmit power and the second antenna maximum transmit power, the maximum transmit power of the primary antenna being greater than the maximum transmit power of the secondary antenna; and transmitting the first signal on the primary antenna and the second signal on the secondary antenna.

17. The method of claim 16 wherein the first antenna is configured to operate at a first frequency, and the second antenna is configured to operate at a second frequency, the first frequency being lower than the second frequency.

18. The method of claim 16 wherein the first antenna is configured to operate at a first frequency, and the second antenna is configured to operate at a second frequency, the first frequency being higher than the second frequency.

19. The method of claim 16 wherein the first signal includes a voice signal.

20. The method of claim 16 further comprising detecting a presence of a user.

21. The method of claim 16 wherein determining the first antenna maximum transmit power and the second antenna maximum transmit power includes obtaining one or more transmit power back-off values from a memory unit.

22. The method of claim 16 wherein generating the first signal and the second signal includes generating the first signal with a first transceiver and generating the second signal with a second transceiver.

23. The method of claim 22 wherein the first transceiver is configured to operate in a first frequency band, and the second transceiver is configured to operate in a second frequency band that is different from the first frequency band.

24. A method for transmitting data in a carrier aggregation scheme, comprising:

determining specific absorption information for each of a plurality of transmitters in a mobile device;

determining a quality of service requirement for each of a plurality of data packets;

determining a transmission schedule based at least in part on the quality of service requirements and the specific absorption information for the plurality of transmitters; and transmitting the plurality of data packets via the plurality of transmitters based on the transmission schedule, wherein one of the plurality of transmitters is associated with a relatively low specific absorption information, and the transmission schedule indicates that a data packet with a high quality of service requirement is transmitted on the one of the plurality of transmitters based on the relatively low specific absorption information.

25. The method of claim 24 further comprising detecting a presence of a user based on input from one or more presence sensors.

26. The method of claim 25 wherein the specific absorption information for each of the plurality of transmitters is based at least in part on the input from the one or more presence sensors.

27. The method of claim 24 wherein the specific absorption information for each of the plurality of transmitters includes determining a transmit power back-off value for each of the plurality of transmitters.

28. The method of claim 24 wherein the plurality of data packets includes voice data and the quality of service requirement for the voice data is a high quality of service.

* * * * *